United States Patent
Li

(10) Patent No.: US 7,564,891 B2
(45) Date of Patent: Jul. 21, 2009

(54) METHOD OF USING LONG CELLIZED CODES IN A JOINT DETECTION SYSTEM

(75) Inventor: Feng Li, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 622 days.

(21) Appl. No.: 11/124,601

(22) Filed: May 5, 2005

(65) Prior Publication Data
US 2005/0243753 A1  Nov. 3, 2005

Related U.S. Application Data

(63) Continuation of application No. PCT/CN03/00961, filed on Nov. 13, 2003.

(30) Foreign Application Priority Data
Nov. 13, 2002 (CN) ................. 02 1 48622

(51) Int. Cl.
*H04B 1/69* (2006.01)
*H04B 1/707* (2006.01)
*H04B 1/713* (2006.01)

(52) U.S. Cl. ............... 375/147; 375/148; 375/150; 375/152; 375/144; 375/143; 370/342; 370/335

(58) Field of Classification Search ......... 375/142–144, 375/147–150, 152; 370/342, 335
See application file for complete search history.

(56) References Cited

U.S. PATENT DOCUMENTS

| 6,714,527 | B2 | 3/2004 | Kim et al. |
| 6,741,653 | B2 * | 5/2004 | Kim et al. ............ 375/240.24 |
| 6,831,944 | B1 * | 12/2004 | Misra et al. .............. 375/147 |
| 6,868,077 | B1 | 3/2005 | Gourgue et al. |
| 6,891,882 | B1 * | 5/2005 | Hosur et al. .............. 375/147 |
| 7,136,369 | B2 * | 11/2006 | Reznik et al. ............. 370/342 |

* cited by examiner

*Primary Examiner*—Phuong Phu
(74) *Attorney, Agent, or Firm*—Harness, Dickey & Pierce, P.L.C.

(57) ABSTRACT

The invention discloses a method of applying a long cell-code in a joint detection system. At transmitters, multiples of the spreading code (spreading factor) is taken as the length of the long cell-code to scramble the signal, and at receivers, the method still takes the multiuser detection to process the received signal. The method includes that: for every antenna unit, making channel estimation to obtain a channel estimation result of each antenna unit; generating a first mid-matrix of the received data of each antenna unit that relates to selected length of said long cell-code and the channel estimation result; based on the first mid-matrix, generating a second mid-matrix and its associate matrix, and then based on said generated second mid-matrix and its associate matrix, generating a third mid-matrix; making Cholesky decomposition of said third mid-matrix, wherein the number of decomposition order relates to the length of said long cell-code; making demodulation processing based on said Cholesky decomposition result and said received signals of all antenna units having been matching filtered. The whole computation loads of the method are acceptable.

3 Claims, 2 Drawing Sheets

METHOD OF USING LONG CELLIZED CODES IN A JOINT DETECTION SYSTEM

CROSS-REFERENCE TO RELATED APPLICATIONS

This application is a continuation of International Application No. PCT/CN2003/000961 filed on Nov. 13, 2003. This application claims the benefit of Chinese Application No. 02148622.0 filed on Nov. 13, 2002. The disclosures of the above applications are incorporated herein by reference.

FIELD OF THE INVENTION

The present invention relates to a CDMA cellular mobile communication system where training sequence is applied, more especially, to a demodulation method at receivers where multiuser detection is deployed while long scrambling code is applied at transmitters.

BACKGROUND OF THE INVENTION

One of the goals for any cellular mobile communication system is to make use of radio resources as much as possible and to provide more and better services. Multiuser detection can obviously raise system performance and capacity, and comparing with the convention RAKE receiver, the spectrum efficiency is almost double.

Nevertheless, computation loads of the multiuser detection are huge and in direct proportion to square of the number of subscribers. It is impossible for the present microprocessor and Field Programmable Logic Array (FPLA) to perform such computation loads. Therefore, in 3GPP two systems: the wide-bandwidth time division duplex (WB-TDD) and narrow-bandwidth time division duplex (NB-TDD), where the multiuser detection is definitely used, the maximum length of spreading code (or spreading factor) in a time slot is 16, thereby the maximum number of subscribers is 16, and the length of scrambling code of local cell, i.e. cell-code for cell identification is 16 too.

The main purposes of the cell-code specified in the CDMA TDD standard are to counteract interference from adjacent cells and to whiten the signals from adjacent cells. This cell-code is different with the long code and short code used in other CDMA systems. In those CDMA systems, all subscribers share one long code and one short code, subscribers are differentiated by different phases of the long code and cells are differentiated by different phases of the short code. However, each cell has its own cell-code. For example, the NB-TDD system has 128 cell-codes.

Since the length of the spreading code and the cell-code of cells are all 16, the length of the spreading modulation code generated by them is 16 too. When there are 128 cell-codes in a system (the system can support 128 cells simultaneously), and each cell-code makes dot produce with 16 WALSH codes, then the system generates 16×128=2048 spreading modulation codes (a spreading modulation code is made by dot produce the WALSH code and the cell-code). In other words, there are 2048 spreading modulation codes with length 16. It is very difficult to guarantee that there are not only 128 groups of orthogonal codes in 2048 spreading modulation codes but also better cross-correlation of different code groups.

Selection of the cell-code length should be taken into account; if length of the cell-code is too short, it is a disadvantage to counteract interference of adjacent cells and is impossible to whiten signals. Taking the NB-TDD system as an example, there are 128 cell-codes, and it is very difficult to have good cross-correlation between these code groups. At present, although from the statistical point of view the cross-correlation properties between codes are better, but correlation between some code groups is very high or even completely correlative. For example, in NB-TDD, the first code and the $126^{th}$ code are as follows:

| Code 1   | 1 | 1 | 1 | 1 | 1  | −1 | 1  | −1 | 1  | −1 | −1 | 1  | 1 | 1 | −1 | −1 |
|----------|---|---|---|---|----|----|----|----|----|----|----|----|---|---|----|----|
| Code 126 | 1 | 1 | 1 | 1 | −1 | 1  | −1 | 1  | −1 | 1  | 1  | −1 | 1 | 1 | −1 | −1 |

When Code 1 makes dot product with WALSH 12, the spreading modulation code is:

1 1 1 1 −1 1 −1 1 −1 1 1 −1 1 1 −1 −1.

When Code 126 makes dot product with WALSH 0, the spreading modulation code is:

1 1 1 1 −1 1 −1 1 −1 1 1 −1 1 1 −1 −1.

It is seen that these two spreading modulation codes are identical, and this is called repetition codes in the system.

As viewed from above instance, with correlation between some codes being very high or even completely correlative, there are some repetition codes in 2048 spreading modulation codes. The repetition code in a CDMA system is a disaster, especially when two subscribers at adjacent cells are allocated with the repetition code. In this case, these two different subscribers have the same spreading modulation code with length 16; only their midamble codes are different. Although these two subscribers can be differentiated by the midamble code, when the subscriber signals come from the same direction (signals from any direction in case of a receiver with omni-antenna), their strong paths are basically coincidence during demodulation, so it is impossible to differentiate the subscribers with the midamble code. With the smart antenna and the code allocation algorithm, the interference can be suppressed in certain degree, but it cannot be completely eliminated. Once different subscriber signals are spread and modulated with the same spreading modulation code, and they arrive the demodulation end at the same time, then strong interference will appear at the receiver. It is almost definitely to say that in this case the receiver cannot correctly demodulate the received signals so that the spreading gain disappears and the system cannot work normally at an identical frequency.

Furthermore, amplitude-frequency characteristic in the band of signals is worse, and cannot satisfy the whitening requirement, so the demodulation is difficult.

There are three solution for the above problem: first solution, to change the scrambling code i.e. cell-code to make that there is no repetition code in the 2048 spreading modulation codes; second solution, with the smart antenna and the code allocation algorithm, to guarantee that no repetition code is used simultaneously at adjacent cells; third solution, to keep longest length of the spreading code being 16 and the maximum number of subscribers being 16, but a long cell-code, such as length of 32, 64 or 128 (a multiple of 16) using for differentiating signals from different cells.

With the first solution, it is necessary to look for new cell-codes, but even though these scrambling codes can be found, it is difficult to change the connatural cross-correlation between codes (because some codes are not completely correlation, but they have high correlation).

With the second solution, the repetition code problem can be avoided in certain degree, but cannot be eliminated completely, and the impact of high correlation codes cannot be avoided.

With the third solution, the repetition code problem is mostly overcome, and the signals are whitened with the long cell-code; this makes that spectrum of the modulated spreading signals becomes more flat, and the peak-average power ratio is decreased, so that requirement to filter performance is reduced and radio frequency system performance is raised. Nevertheless, with this solution, signal-processing method needs to be changed and the computation loads are increased.

When the long cell-code is applied at the transmitter and joint detection is still made at the receiver, the computation loads will be much more increased. Up till now, there is no any disclosed method to implement this solution.

SUMMARY OF THE INVENTION

Objective of the invention is to design a method that uses long cell-code in the joint detection system, which is one of above third solutions. The method takes a long cell-code, which is a multiple of the system maximum spreading factor 16, such as 32, 64 or 128 etc., to scramble the transmitted signal; and at the same time, makes the multiuser detection to process the received signal. In this way, the computation loads are acceptable.

Objective of the invention is implemented in the following scheme:

A method for applying a long cell-code in a joint detection system, comprising, taking the long cell-code of which length is multiples of spreading factor as a scrambling code of a local cell. Wherein the length of the long cell-code is multiples of 16.

A demodulation method in a joint detection system where a long cell-code is applied, comprises, A. making a channel estimation for midamble code part of a signal received by every antenna unit, to obtain a channel estimation result of each antenna unit;

B. calculating a first mid-matrix of the received signal of each antenna unit; wherein the first mid-matrix relates to length of the long cell-code and the channel estimation result of each antenna unit, length of the long cell-code is multiples of 16;

C. based on the first mid-matrix of the received signal of each antenna unit, calculating a second mid-matrix and its associate matrix; and then based on the second mid-matrix and its associate matrix, calculating a third mid-matrix, which is a symmetric definite matrix;

D. making Cholesky decomposition for the third mid-matrix, wherein the number of decomposition order relates to the length of long cell-code;

E. matched filtering the received signals of all antenna units, and then making demodulation calculation based on the Cholesky decomposition result of the third mid-matrix and the matching filtered received signals.

In this invention, in adjacent cells the length of the cell-code is the multiple of 16, but the spreading code length keeps 16, so the frame format is unchanged, the repetition code is avoided, and the interference is obviously suppressed. At the same time, the receiver still applies multiuser detection, so the demodulation performance is kept, the cell signal is more whitened, the modulated spreading signal is more flat, the peak-average power ratio is decreased, and the requirement of the filter performance is reduced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE PREFERRED EMBODIMENTS

The following description of the preferred embodiment(s) is merely exemplary in nature and is in no way intended to limit the invention, its application, or uses.

Figure 1:
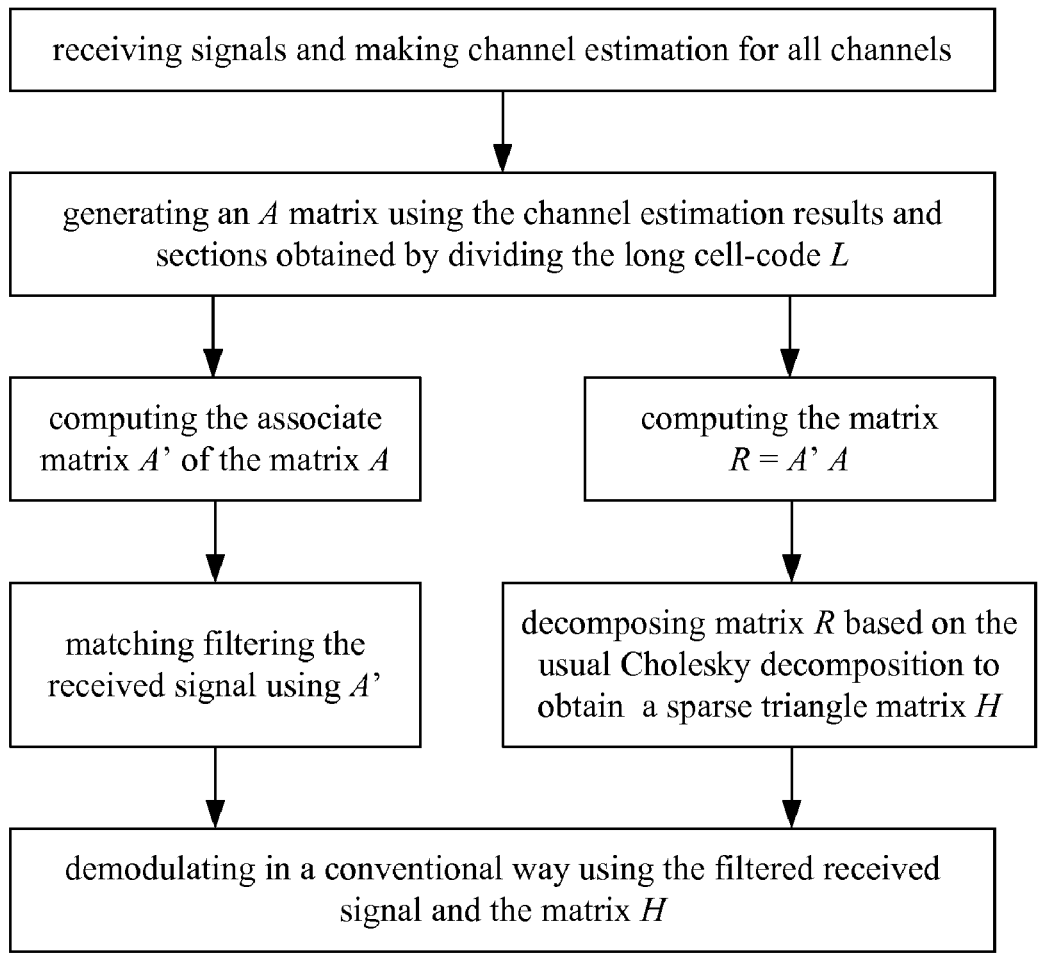
FIG. 1 is a flowchart illustrating a processing method for the long cell-code signal at the receiver in accordance with the present invention.

A processing method for the long cell-code signal at the receiver is as shown in FIG. 1, and will be described in more detail in the following and six parts are comprised.

1. The receiver receives signals and makes channel estimation for all channels. The channel estimation result $h^{k_a}$ of the $k_a^{th}$ antenna unit is calculated with the following formula:

$$\underline{h}^{(k_a)} = IDFT(\underline{G}^{-1} \cdot DFT(\underline{e}_m^{(k_a)})), k_a = 0 \ldots K_a - 1,$$

wherein a symbol with underscore denotes a vector (it is the same hereinafter);

DFT means a discrete Fourier transformation;

IDFT means an inverse discrete Fourier transformation;

$e_m$ is the midamble code of the received data;

$K_a$ is the total number of the antenna units;

$k_a$ is one of the antenna units;

$\underline{G}^{-1}$ is the inverse matrix of the correlation matrix of a midamble code;

h is channel estimation result, and there are $K_a$ channel estimation results in total.

2. According to the $K_a$ channel estimation results and the selected cell-code L, a second mid-matrix, called A matrix, is generated in four steps:

First step, the long cell-code L is divided by 16 to obtain M=L/16 sections; each section makes dot product with the WALSH code, respectively, and then multiplies with a corresponding value j (j is a value for angle transformation based on communication standard) to obtain M vectors $\underline{c}_m$, the length of $\underline{c}_m$ is 16, and m is from 1 to M;

Second step, Compute every matrix with (16+(window length−1))×16 in the first mid-matrix $A^{k_a}$ according to the following formula (said window length is the window length during channel estimation):

$$\underline{b}_m^{(k_a, k_{vru})} = \underline{h}^{(k_a, k_{vru})} \otimes \underline{c}_m^{(k_{vru})}, k_{vru} = 0 \ldots K_{vru} - 1, k_a = 0 \ldots K_a - 1$$

wherein:

$\underline{b}_m$ is a column of the matrix;

$k_a$ is one of the $K_a$ antenna units and takes value from 0 to $K_a-1$;

$K_{vru}$ is the total number of code channels occupied by the subscriber;

$k_{vru}$ is one of the $K_{vru}$ code channels and takes value from 0 to $K_{vru}-1$;

$\otimes$ is the convolution operation.

Figure 2:
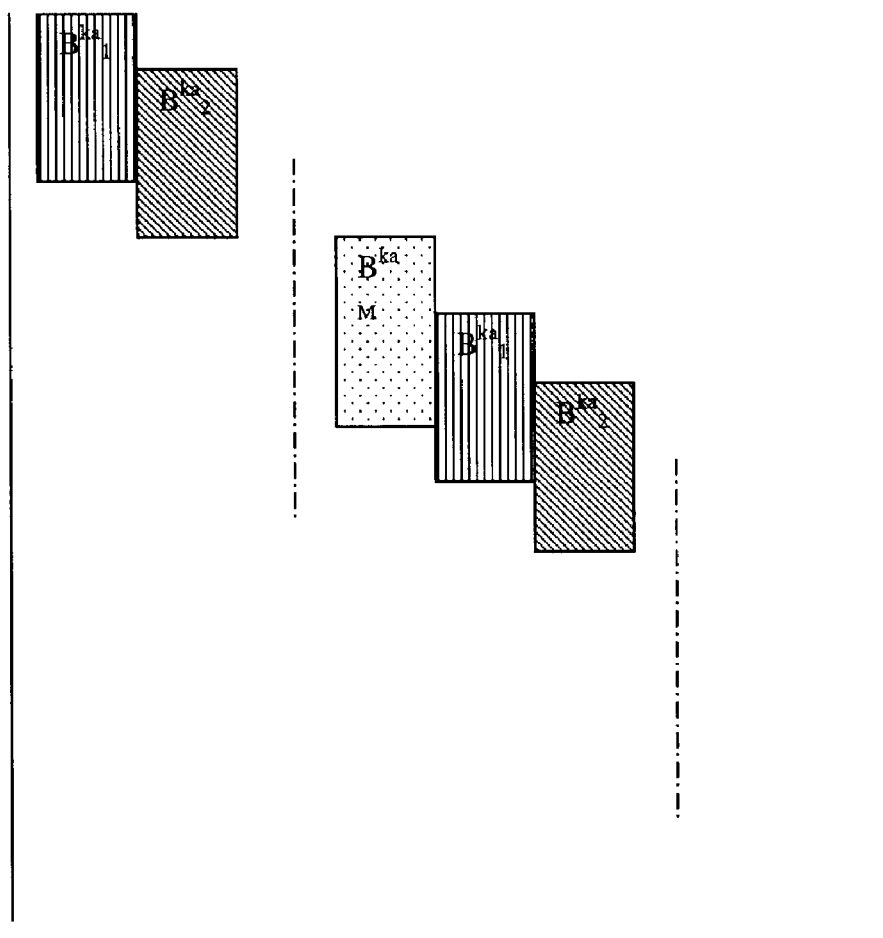
FIG. 2 is a schematic illustrating a structure of a web TV system.

Third step, Based on the M matrixes obtained at Step 2, the matrixes $B^{ka}_1, B^{ka}_2, \ldots B^{ka}_M$ of the first mid-matrix $A^{ka}$, as shown in FIG. 2, are generated and then repeated (in the following first mid-matrix $A^{ka}$, the line rectangle, sloping line rectangle and point rectangle represent the $B^{ka}_1, B^{ka}_2$ and $B^{ka}_M$, respectively, to show the repeat relationship). The number of the unrepeated matrixes $B^{ka}_m$ in the first mid-matrix $A^{ka}$ is related with the $c_m$, i.e. the cell-code length. The length of the long cell-code is multiple of 16, and the length of $c_m$ is 16. Except the $B^{ka}_1, B^{ka}_2, \ldots B^{ka}_M$, other positions in the first mid-matrix $A^{ka}$ are zero, and the computation loads in the successive steps will be greatly decreased.

Fourth step, compute the second mid-matrix A based on the $K_a$ computed results in the third step.

$$A = \begin{bmatrix} A^{k1} \\ A^{k2} \\ A^{k3} \\ \vdots \\ A^{K_a} \end{bmatrix}$$

3. Based on the second mid-matrix A, a third mid-matrix called R matrix will be generated in two steps:

First step, Compute the associate matrix A' of the matrix A;

Second step, Compute the matrix R, wherein $\underline{R}=A'A$, according to the following formula:

$$R = \begin{bmatrix} R0_1 & R1_1 & & & & & \\ R1_1 & R0_2 & R1_1 & & & & \\ & R1_2 & R0_3 & & & & \\ & & & & & & \\ & & & R0_M & R1_M & & \\ & & & R1_M & R0_1 & R1_1 & \\ & & & & & R1_1 & \end{bmatrix}$$

The above R matrix is a symmetric definite matrix. The characteristics of the matrix R are that: the $R0_1, R0_2, R0_3, \ldots R0_M$ are distributed and repeated in the diagonal of the matrix, and the $R1_1, R1_2, \ldots R1_M$ are distributed and repeated symmetrically in both side of the diagonal. The matrix R is used for Cholesky decomposition in the next step.

4. The matrix R is decomposed based on the usual Cholesky decomposition formula $\underline{R}=H^TH$ (T is the transpose symbol). When the long cell-code length is 48, 64, 128 ..., i.e. three multiples or more than three multiples of 16, the decomposition result is a sparse triangle matrix H shown in the following:

$$H = \begin{bmatrix} H_1 & H_2 & & & \\ & H_3 & H_4 & & \\ & & H_5 & H_6 & \\ & & & & \\ & & & H_{41} & H_{42} \\ & & & & H_{43} & H_{44} \end{bmatrix}$$

Wherein $H_1, H_3, H_5, \ldots, H_{43}$ are the 16×16 triangle matrixes, and $H_2, H_4, H_6, \ldots, H_{44}$ are the 16×16 square matrixes, all other elements are zero.

5. The received signal is matching filtered with the following formula:

$$\underline{e}_{MF}=A'\times e;$$

wherein:

e is the received signal of all antenna units;

$\underline{e}_{MF}$ is the received signal of all antenna units except the midamble code;

A' is the associate matrix of the matrix A.

6. Based on the obtained $\underline{e}_{MF}$ and matrix H, the demodulation processing is done in a conventional way which is solution to a equitation, and the receiver will perform the received signal processing with the long cell-code based on the multiuser detection.

With the above computation procedure, when the spreading factor is still 16, and the antenna array is a signal antenna and eight antennas, the computation loads of applying the long cell-codes, such as 32, 64 and 128, are shown in the following table, wherein the MOPS is ten thousand times of operation per second, for example 80MOPS is eighty thousand times per second.

| Cell-code length | Single antenna | Eight antennas |
| --- | --- | --- |
| 16 | 80MOPS | 283MOPS |
| 32 | 130MOPS | 400MOPS |
| 64 | 192MOPS | 595MOPS |
| 128 | 229MOPS | 900MOPS |

The above table shows that when the spreading factor is still 16 and the longer cell-code is used, such as 32, 64 or 128, not only the interference between cells is suppressed effectively, but also the system frame format need not be changed, and the computation loads are acceptable. When the scrambling code length 32 is applied, the computation loads are larger about 50% compared with the scrambling code length 16. Even though the scrambling code length 128 is applied, the computation loads only increase about three times; this is acceptable.

Without the computation method of the invention, when a long cell-code is applied, such as 32, 64 or 128, it is necessary to compute directly the matrix A with 32, 64 or 128 dimension, respectively, and to compute the associate matrix A' of the matrix A and to decompose these matrixes; the computation loads are directly proportional to three cube of the matrix dimension. It is impossible for the present computation device to perform it, and this is why the cell-code length with 16 is applied in the TD-SCDMA mobile communication standard. With the invention demodulation method, the original large matrix is decomposed into several matrixes with (16+(window−1))×16 (the $B^{ka}_1, B^{ka}_2, \ldots, B^{ka}_M$ of the first mid-matrix), so the computation loads are acceptable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A demodulation method in a joint detection system where a long cell-code is applied, comprising,
   A. making a channel estimation by a receiver for midamble code part of a signal received by every antenna unit, to obtain a channel estimation result of each antenna unit;
   B. calculating a first mid-matrix of the received signal of each antenna unit; wherein the first mid-matrix relates to length of the long cell-code and the channel estimation result of each antenna unit, length of the long cell-code is multiples of 16;
   C. based on the first mid-matrix of the received signal of each antenna unit, calculating a second mid-matrix and its associate matrix; and then based on the second mid-matrix and its associate matrix, calculating a third mid-matrix, which is a symmetric definite matrix;
   D. making Cholesky decomposition for the third mid-matrix, wherein the number of decomposition order relates to the length of long cell-code;
   E. matched filtering the received signals of all antenna units, and then making demodulation calculation based on the Cholesky decomposition result of the third mid-matrix and the matching filtered received signals.

2. The method according to the claim 1, wherein Step A comprises,
   calculating channel estimation result $h^{k_a}$ of the $k_a^{th}$ antenna unit with the following formula:

$$\underline{h}^{(k_a)} = IDFT(\underline{G}^{-1} \cdot DFT(\underline{e}_m^{(k_a)})), k_a = 0 \ldots K_a - 1,$$

where $e_m$ is the midamble code of the received signal; $k_a$ is one of the total $K_a$ antenna units and takes value 0 to $K_a - 1$; $\underline{G}^{-1}$ is the inverse matrix of the correlation matrix of a midamble code; and h is a channel estimation result;

Step B comprises,
   B1. dividing the long cell-code L by 16 to obtain M=L/16 sections; making dot product with the WALSH code for each section, respectively, and then multiplying with a corresponding value j, which is a angle transform based on communication standard, to obtain M vectors $\underline{c}_m$, the length of $\underline{c}_m$ is 16, and m is from 1 to M;
   B2. computing each column of a matrix in the first mid-matrix $A^{K_a}$ with the formula $\underline{b}_m^{(k_a,k_{vru})} = \underline{h}^{(k_a,k_{vru})} \otimes \underline{c}_m^{(k_{vru})}$, to obtain M matrixes $B^{k_a}_1, B^{k_a}_2 \ldots B^{k_a}_M$; forming the first mid-matrix with repeating the obtained M matrixes in a diagonal direction of the first mid-matrix, wherein $k_{vru}$ is one of the total $K_{vru}$ code channels occupied by the subscriber and takes value from 0 to $K_{vru} - 1$, and, each of matrixes is constituted of M columns;

Step C comprises,
   C1. calculating the second mid-matrix A according to $K_a$ results of first mid-matrix, and then calculating the associate matrix A' of the second mid-matrix A:

$$A = \begin{bmatrix} A^{k_1} \\ A^{k_2} \\ A^{k_3} \\ \vdots \\ A^{K_a} \end{bmatrix};$$

C2. Obtaining the third mid-matrix R from the formula $\underline{R} = A'A$, $$R = \begin{bmatrix} R0_1 & R1_1 & & & & & \\ R1_1 & R0_2 & R1_1 & & & & \\ & R1_2 & R0_3 & & & & \\ & & & \ddots & & & \\ & & & & R0_M & R1_M & \\ & & & & R1_M & R0_1 & R1_1 \\ & & & & & R1_1 & \end{bmatrix};$$

Step D comprises,
   making Cholesky decomposition according to the formula: $\underline{R} = H^T H$,
   wherein, in case of the length of the long cell-code being three or more than three multiple of 16, the decomposed result matrix H is:

$$H = \begin{bmatrix} H_1 & H_2 & & & & \\ & H_3 & H_4 & & & \\ & & H_5 & H_6 & & \\ & & & \ddots & & \\ & & & & H_{41} & H_{42} \\ & & & & & H_{43} & H_{44} \end{bmatrix};$$

where $H_1, H_3, H_5, \ldots, H_{43}$ are 16×16 triangle matrixes, and $H_2, H_4, H_6 \ldots H_{44}$ are 16×16 matrixes, all other elements of the H matrix are zero.

3. The method according to the claim 1, wherein matched filtering the received signals of all antenna units in Step E comprises, calculating the received signal of all antenna units except the midamble code through formula: $\underline{e}_{MF} = A' \times e$, where $\underline{e}_{MF}$ is the received signal of all antenna units except the midamble code; e is the received signal of all antenna units, and A' is the associate matrix of second mid-matrix.

* * * * *